(12) United States Patent
Rottner et al.

(10) Patent No.: US 6,466,339 B1
(45) Date of Patent: Oct. 15, 2002

(54) IMAGE SCANNER WITH FRAME MOUNTED LENS AND SENSOR AND IMAGE SCANNING METHOD

(75) Inventors: Bruce E. Rottner; Kenneth R. Kanis, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/141,693

(22) Filed: Aug. 28, 1998

(51) Int. Cl.[7] .................................................. H04N 1/04
(52) U.S. Cl. ........................................ 358/474; 382/175
(58) Field of Search ................................. 358/474, 505, 358/500, 403, 496, 498, 296; 382/175, 176

(56) References Cited

U.S. PATENT DOCUMENTS

| | | | |
|---|---|---|---|
| 4,194,836 A | 3/1980 | Rapp et al. ................... 355/75 |
| 4,576,471 A | 3/1986 | Kogane et al. ................ 355/75 |
| 5,617,185 A | 4/1997 | North ........................... 355/75 |
| 5,619,305 A | 4/1997 | Yamamoto et al. ........... 355/75 |
| 5,710,642 A | * 1/1998 | Kiesow ........................ 358/474 |
| 5,757,519 A | * 5/1998 | Yoo ............................. 358/475 |
| 5,767,989 A | * 6/1998 | Sakaguchi ................... 358/474 |

\* cited by examiner

*Primary Examiner*—Jerome Grant, II
*Assistant Examiner*—Negussie Worku
(74) *Attorney, Agent, or Firm*—David A. Novais

(57) ABSTRACT

A scanner includes a gate to receive a media carrying an image to be scanned. A frame is movable toward and away from the gate between a scanning position and a retracted position spaced further away from the gate than the scanning position. A sensor and a lens mounted on the frame, which sensor and lens move with the frame between the scanning and retracted positions, so that the lens can focus at least part of an image in the gate onto the sensor. A method of scanning images is also provided.

24 Claims, 11 Drawing Sheets

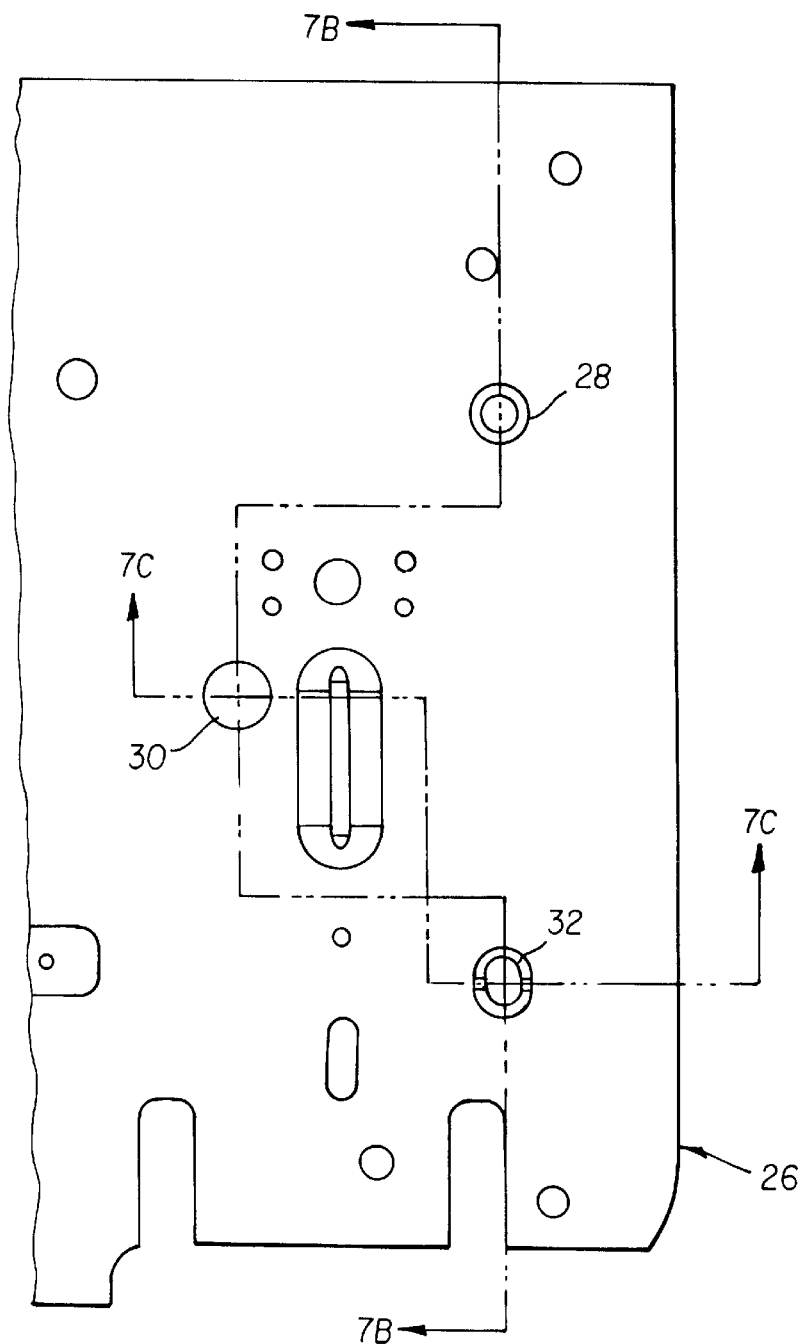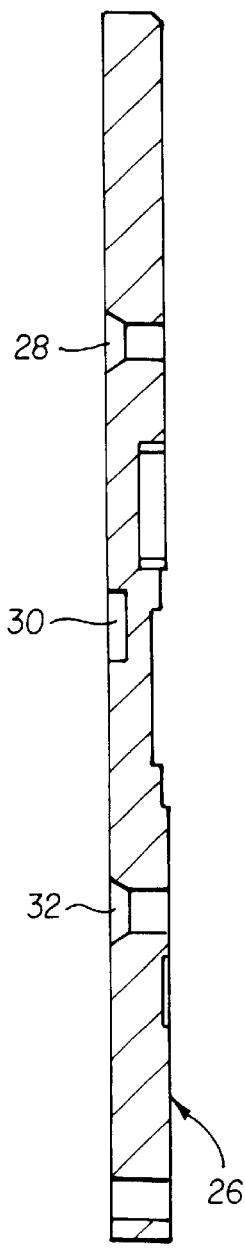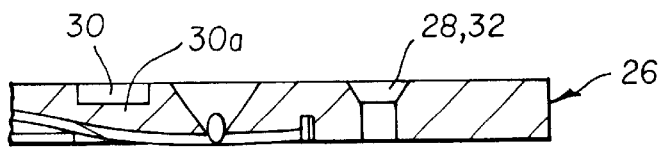
FIG. 7A
FIG. 7B
FIG. 7C

US 6,466,339 B1

IMAGE SCANNER WITH FRAME MOUNTED LENS AND SENSOR AND IMAGE SCANNING METHOD

FIELD OF THE INVENTION

This invention relates to image scanners which generate image signals corresponding to the scanned images.

BACKGROUND OF THE INVENTION

Scanners convert hard copy analog images on a media into image signals typically in the form of digital data. The media can be either transparent (for example, a photographic negative) or reflective (for example, a photographic paper print). The use of scanners has become widespread for a variety of applications, including storing, manipulating, transmitting and displaying or printing copies of the images. For example, images captured in photographic media can be converted to digital data and stored on compact discs for readout and display as a video image or for printing with various types of color printers. In order to capture the photographic image signal, an image frame is scanned with light, such as a line of light or a full frame of light, and the light transmitted through the image is detected, typically as three primary color light intensity signals, and then digitized. The digitized values may be formatted to a standard for video display and stored on compact disc, magnetic media, or other suitable storage. Scanners take a variety of forms and the various common aspects of film digitizing, particularly line illumination and linear CCD-based digitizers, are described in greater detail in U.S. Pat. No. 5,012,346. For example, in one common type of scanner a one-dimensional sensor (typically referenced as a line sensor or one-dimensional array) is used and the illumination source directs a line of light onto the image bearing media, which is then moved one line at a time to scan the complete image line by line. In another scanner type, a two-dimensional sensor (typically referenced as a two dimensional or area array) is used, and the illumination source illuminates the entire image at the same time, so that the complete image is scanned in a single exposure. Scanners with area arrays are simpler to construct and are often preferred. However, scanners with line sensors provide higher resolution at lower equipment cost. A sensor assembly of a typical color scanner includes both the sensor and suitable electronics, so as to provide a multi-color channel output signal representing the scanned image, with each color channel corresponding to a different spectral region (for example, red, green and blue channels, or cyan, magenta and yellow channels).

Recently, photographic images received at a photographic laboratory have been scanned to provide corresponding digital image signals. These image signals have then been used to generate index prints or provide images on storage media such as magnetic or optical disks, to upload the digital image signals to a remote storage location through a network (such as the Internet) for later access by customers. Systems and methods of the foregoing type are described, for example, in U.S. Pat. No. 5,760,916 and U.S. Pat. No. 5,760,917. The foregoing references, and all other references cited in the present application, are incorporated in this application by reference. It has also been suggested that the digital image signals can be used on a printer to produce the full-size customer image prints or other image products incorporating the customer images. Photofinishing laboratories and methods using digital images are described, for example, in the following U.S. Patent Applications all assigned to Eastman Kodak Co.: Ser. No. 09/087,014 filed May 29, 1998, titled "IMAGE PROCESSING"; Ser. No. 09/107,571 filed Jun. 29, 1998, titled "IMAGE MOVEMENT IN A PHOTOGRAPHIC LABORATORY"; and S.N. (not yet known) filed Jul. 31, 1998, titled "IMAGE QUEING IN PHOTOFINISHING" (inventors G. Bryniarski, B. Wilson, L Bovenzi; attorney docket number 78142).

Film scanners include a film gate typically having some means, such as a track of appropriate width, to guide a filmstrip. Previously, most consumer filmstrips were conventional 35 mm film. However, filmstrips of the recently introduced Advanced Photo Systems ("APS") formats are only 24 mm in width. Furthermore, the image sizes on an exposed APS filmstrip are of a different maximum width than those on a 35 mm filmstrip. Both conventional 35 mm and APS film formats are expected to coexist in the market for some time. Thus, photofinishing operations which receive consumer filmstrips for chemical developing and scanning, must either provide two different scanners (one for each format of film) or provide a single scanner which can handle both formats. It is preferable to have a scanner which can handle both film formats to keep total costs of a photofinishing system low. Thus, a single scanner capable of handling both formats must accommodate both the different physical widths of the filmstrips as well as the different image sizes. Different filmstrip widths can be accommodated by using, for example, interchangeable film gates dimensioned to guide the respective different width filmstrips. Different image widths can be accommodated by using different lens systems to correctly focus the different sized images of the different formats, onto the same sensor. In such an arrangement though, the lens system must typically be pulled back from the film gate to allow access to it for changing when film formats are changed. When the film gate has been replaced each of the lens systems must be re-focussed since even small movements of lens system along an optical axis between the film gate and a sensor, can substantially alter the focussing of an image in the gate onto the sensor. Even for scanners which are intended to scan only one film format, it may be necessary to pull the single lens system back from the film gate for cleaning and or repair. Such refocusing wastes time, particularly during the more frequent film gate changes that are likely to occur in a scanner constructed with interchangeable gates to handle different film formats, and therefore decrease productivity in the photofinishing laboratory.

It would be desirable then, to provide a scanner in which a lens system can be pulled back from a film gate to allow access to it, and which lens system can be rapidly repositioned over the film gate in a correct focal position relative to the sensor. It would particularly be desirable to provide such a scanner which has an interchangeable gate and at least two lens systems, to accommodate different filmstrip formats.

SUMMARY OF THE INVENTION

The present invention, then, provides in one aspect a scanner having a gate to receive a media carrying an image to be scanned. A frame is provided which is movable toward and away from the gate between a scanning position and a retracted position spaced further away from the gate than the scanning position. The scanner further includes a sensor and a lens mounted on the frame, which sensor and lens move with the frame between the scanning and retracted positions, so that the lens can focus at least part of an image in the gate onto the sensor.

In the various aspects of scanners of the present invention, there may be included a first driver connected to the frame, to move the frame and attached sensor and lens between the scanning and retracted positions. Further, movement may be allowed for the lens (sometimes referenced herein as a lens system) in a direction toward and away from the gate (that is, along an optical axis between the gate and the sensor when the frame is in the scanning position). However, having the sensor and lens attached to the frame so as to be essentially immovable relative to the frame in the direction toward and away from the gate, reduces the possibility of having to refocus a lens. Scanners of the present invention may also include an illumination system to illuminate an image in the gate.

In one aspect, at least a portion of the frame contacts the scanning gate when the frame is in the scanning position. Such an arrangement helps to position the frame, lens, and sensor in relation to the scanning gate. Other arrangements could be used though. In another aspect the frame and gate together have at least one set of mating members which, when mated, define the scanning position. Each such set may, for example, comprises a protrusion member and a receptacle member. In a particular aspect, the mating members may restrain movement of the frame in one, or three of the following directions, namely movement of the frame toward the gate, lateral movement of the frame with respect to the gate, and rotational movement of the frame with respect to the gate. Three sets of members may particularly, but not necessarily, be used to restrain movement in all three of the directions.

In another aspect of a scanner of the present invention, the scanner includes a sensor and at least two lenses mounted on the frame, which sensor and lenses move with the frame between the scanning and retracted positions. Each of the lenses is transversely movable in turn into an optical path between the gate and the sensor when the frame is in the scanning position, so as to focus at least part of an image in the gate onto the sensor. Such movement may be linear movement, or rotational movement about a common axis of rotation (such as when both lenses are mounted on a rotating turret). Movement can be accomplished by a second driver connected to the lenses to move each into and out of the optical path. Both lenses may be attached to the frame so as to be immovable relative to the frame in the direction toward and away from the gate, as described above.

The present invention further provides a method of scanning images carried by elongated films, using a scanner having a gate, a frame, and a lens and sensor both attached to the frame (which scanner may particularly be a scanner of the present invention). The method includes, when the frame is in a scanning position, directing light through an image on a first film, through the lens and onto the sensor, to convert the image into a corresponding image signal. The frame, lens and sensor are moved as a unit away from the gate by urging the frame away from the gate. At least a portion of the gate is modified (for example, by replacing a corresponding portion or moving a portion such as a guide, or by adjusting an existing portion of the gate) to accommodate a second film of a width different from the first film. The frame is moved back into the scanning position so that at least part of an image on the second film in the gate will be focussed by the lens onto the sensor. Light can then be directed through an image on the second film, through the lens and onto the sensor, to convert the image into a corresponding image signal.

In one aspect of the method, at least the part of the image on the second film is focussed by the lens onto the sensor without movement of the lens with respect to the frame in a direction toward or away from the gate. In another aspect of the method, there is provided a method of scanning images carried by elongated films, using a scanner having a gate, a frame, at least two lenses attached to the frame, and a sensor attached to the frame (which scanner may particularly be a scanner of the present invention). This aspect is essentially the same as the method described above, and additionally includes moving the first one of the lenses out of the optical axis and moving a second one of the lenses into the optical axis (this typically being done before directing light through an image on the second film).

The present invention allows a scanner lens system to be pulled back from a film gate to allow access to it, while the lens system can be rapidly repositioned over the film gate in a correct focal position relative to the sensor. This is particularly useful where some aspect of the gate must be modified, just as when one part is adjusted or exchanged to accommodate a filmstrip of a different format and which must be imaged onto the sensor by a different lens.

BRIEF DESCRIPTION OF THE DRAWINGS

Embodiments of the invention will now be described with reference to the drawings, in which:

FIGS. 7A–7C represent an enlarged view of a portion of the film gate of FIG. 6;

Where practical, the same reference numbers have been used throughout the drawings to designate corresponding components.

DETAILED DESCRIPTION OF THE INVENTION

Figure 3:
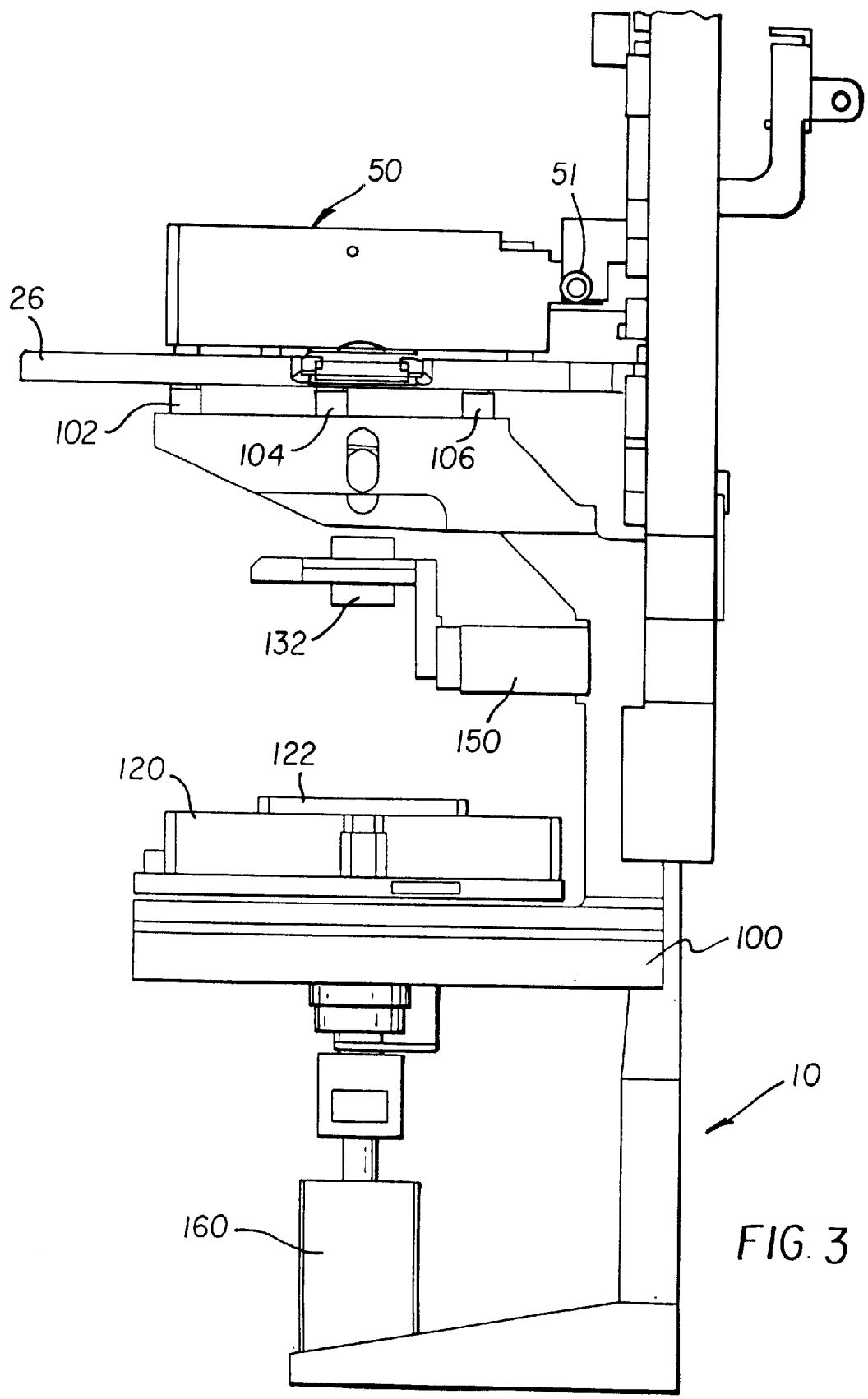
FIG. 3 is a side view of the scanner of FIG. 1 showing the scanner frame in the scanning position.
Figure 4:
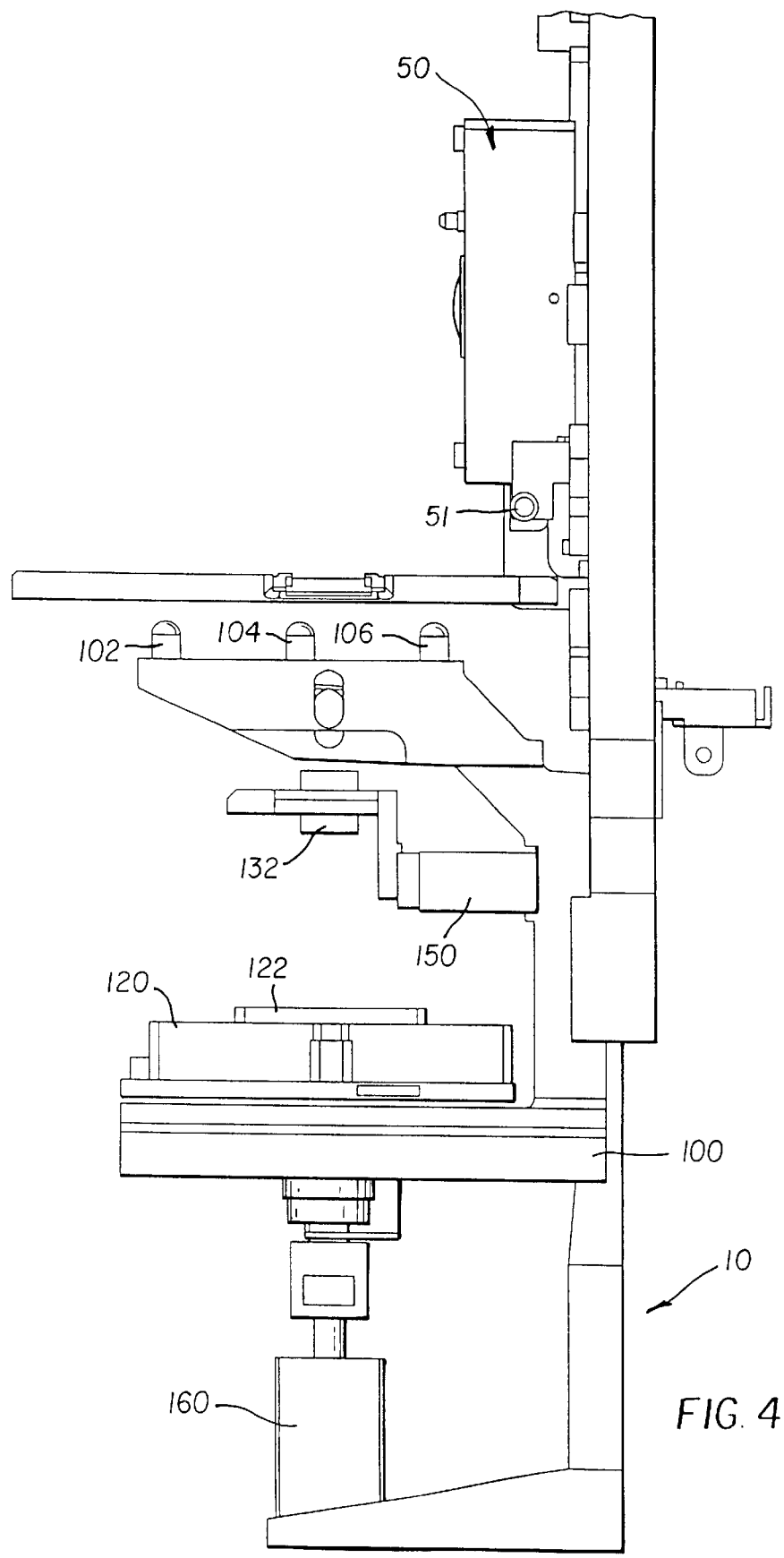
FIG. 4 is a view the same as FIG. 3 showing the frame in the retracted position.
Figure 5:
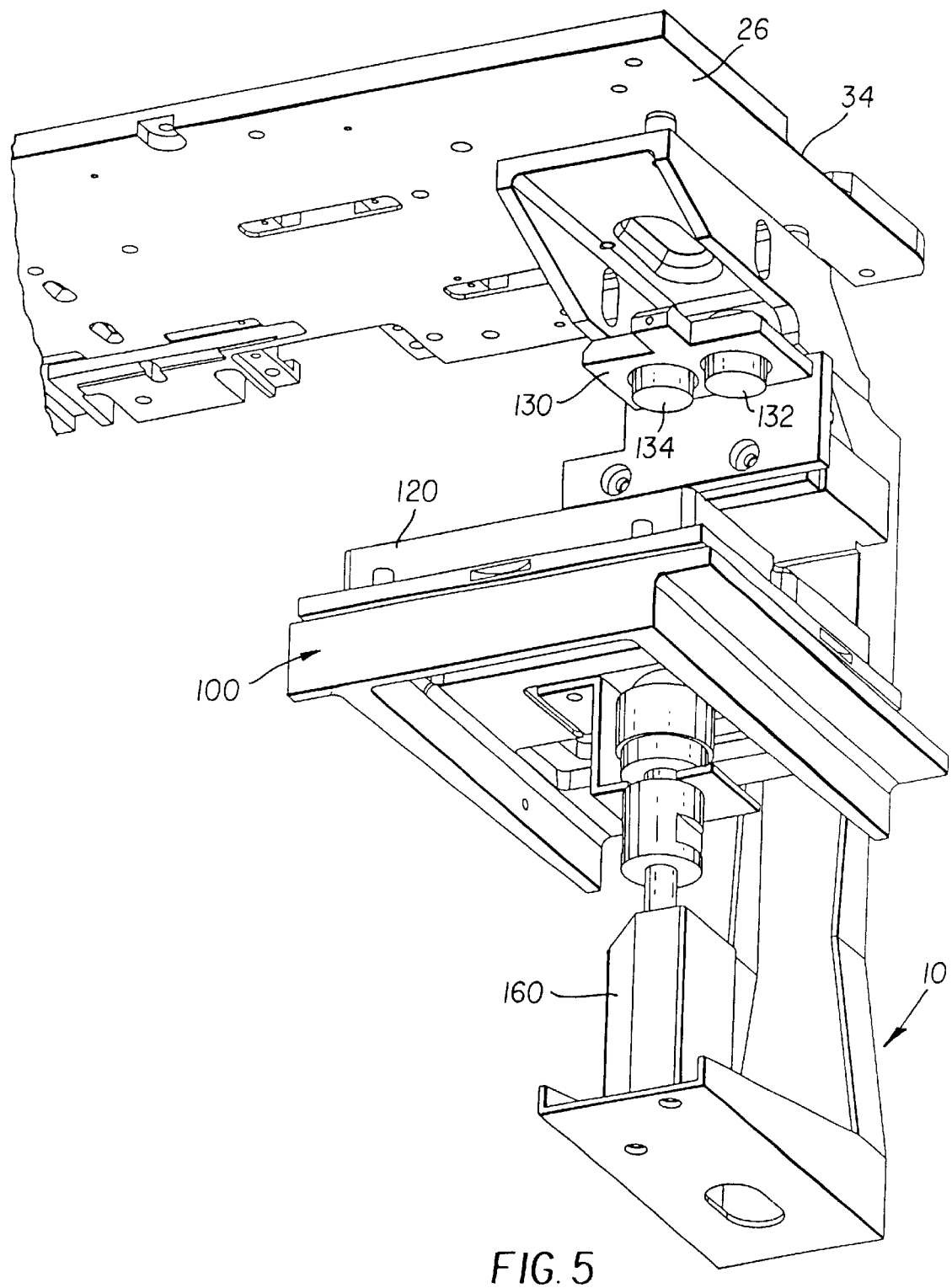
FIG. 5 is a perspective view, from below, of the scanner of FIG. 1.
Figure 6:
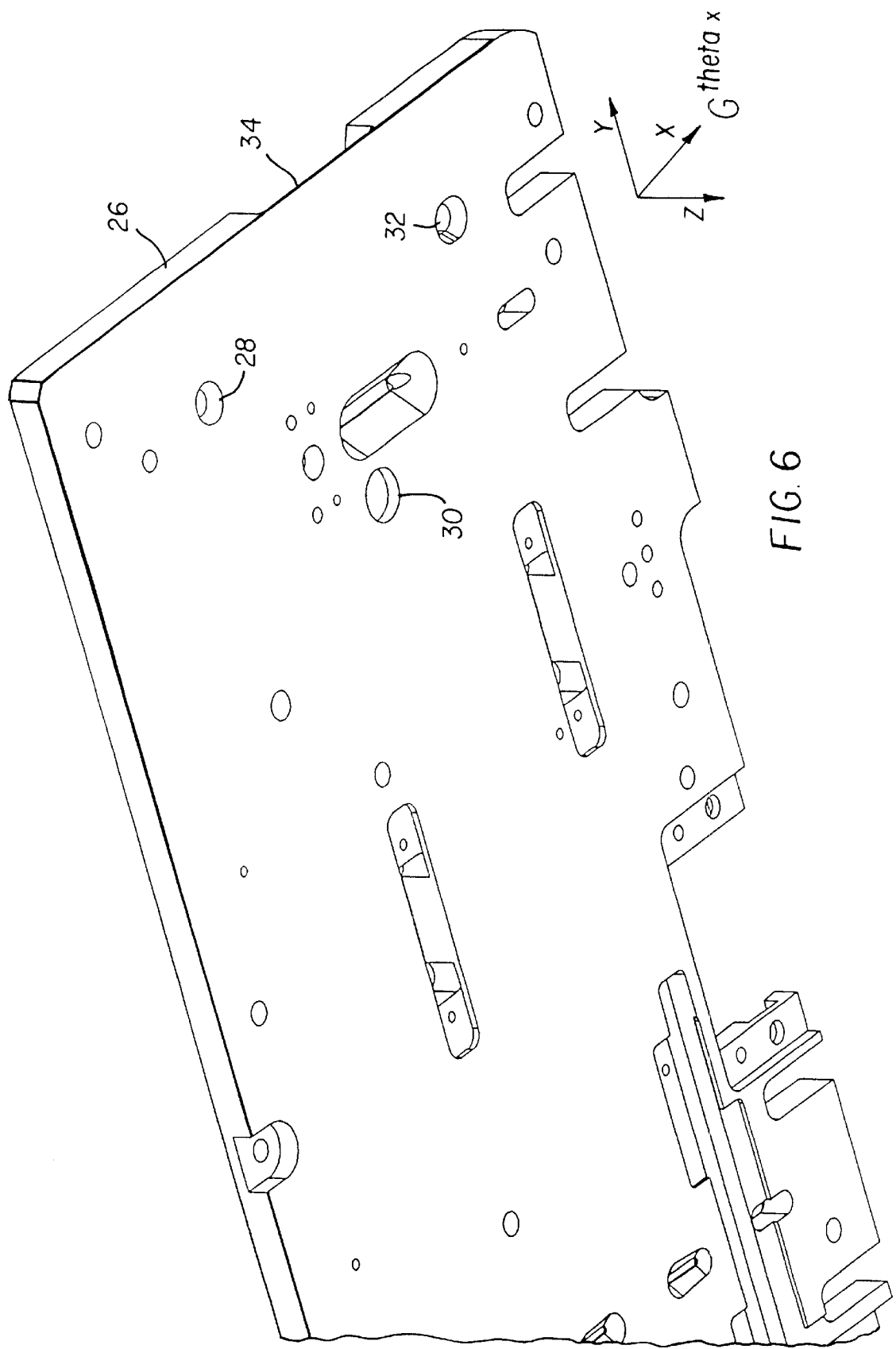
FIG. 6 is a perspective view, from below, of the film gate of the scanner of FIG. 1.

Referring first to FIGS. 1 through 7A–7C, the scanner shown includes a support 10 which may be part of, or mounted on, a suitable housing (not shown) along with film gate 20. Film gate 20 includes a plate 26 carrying two opposed film edge guides 22, 24 between which a film can be moved longitudinally at an image plane 34 (the movement of the film being in the direction in or out of the paper as viewed in FIG. 1). Edge guide 22 is fixed in position on plate 26 while edge guide 24 is spring loaded to be movable between leftmost and right most positions, as viewed in FIG. 1. In this manner, film gate 26 can accommodate variations in film width including splice variations. An image on a film at film plane 34, can be illuminated by an illumination system 80 which includes illuminator housing 50 carrying an integrating rod 54 and light guide 56. Housing 50 can be moved away from gate 20 by manually pivoting it about a hinge 51, as illustrated in FIG. 4. Light guide 56 is relatively thin in the direction in and out of the paper as viewed in FIG. 1, so as to illuminate only a narrow linear region at image plane 34. The illumination system further includes electric light 82, heat absorbing filter 84, two position balance filter assembly 86 (for negative and positive color films), and two position dark shutter assembly 88 (having an open and a shut position in which light from light 82 is passed or blocked, respectively). Light from light 82, after passing through filters 84, 86 and open shutter assembly 88, is directed into integrating cavity 54 by a light guide 58 and concentrator cone 60. Integrating cavity 54 and cone 60 may be of a type described in U.S. Pat. No. 5,335,158, HIGH EFFICIENCY LINEAR LIGHT SOURCE and U.S. Pat. No. 5,274,228, LINEAR LIGHT SOUSRCE COLLECTOR WITH INTEGRATOR CYCLINDER AND LIGHT PIPE MEANS. Plate 26 includes three receptacle members 28, 30, 32 whose function will be described further below.

The scanner also has a frame 100 which is mounded for movement relative to support 10 in a direction toward and away from gate 20 (and hence toward and away from image plane 34) between a scanning position (shown in FIG. 3) and a retracted position (shown in FIG. 4). Note that the retracted position is further away from gate 20 than the scanning position. A first driver in the form of a pneumatic cylinder 160, is connected between support 10 and frame 100 to accomplish the foregoing movement. A sensor in the form of a tri-linear sensor assembly 122 is fixedly mounted to frame 100 by being mounted on a sensor housing 120 attached to frame 100. Tri-linear sensor assembly 122 includes three line CCD sensors each responsive only to a given spectral region (as a result of, for example, each being shielded by red, green and blue filters, respectively). Such tri-linear sensor assemblies are well known in photographic image scanners. Two lens assemblies 132, 134 are also mounted to frame 100 through lens mount 130, and a second driver in the form of a second pneumatic cylinder 150. Pneumatic cylinder 150 moves the lens assemblies 132, 134 in a straight line (that is, "linearly") in a transverse direction (that is, transverse to the direction in which they direct light) into and out of the paper, as viewed in FIGS. 1, 3 and 4 so that either lens can be positioned, in turn, in an optical path along optical axis 155 (which extends in a direction between the image plane 34 at film gate 20 and sensor assembly 122). Thus, each of lens assemblies 132, 134 can focus at least part (in particular, one line at time) of an image at image plane 34 onto sensor assembly 122. However, while lens assemblies 132, 134 can move in the transverse direction, they cannot be moved relative to frame 100 in the direction of the optical path (in particular, in the direction of axis 155). Similarly, sensor assembly 122 likewise cannot be moved relative to frame 100 in the direction of the optical path (although lens assemblies 132, 134 and sensor assembly 122 will be moved with frame 100).

It will be appreciated from the above construction then, that frame 100, sensor assembly 122, and lens assemblies 132, 134 move together as a unit, toward and away from film gate 20 (in particular, in the direction of optical axis 155), upon urging of the frame 100 in such a direction by pneumatic cylinder 160. A light shield 170 is positioned between lens assemblies 132, 134 and sensor assembly 122 to shield sensor assembly 122 from stray light during operation of the scanner.

Frame 100 includes, at an upper end, three protrusion members 102, 104, and 106. Protrusion member 102 together with receptacle 28 form a first set of mating members. Likewise, protrusion member 104 and receptacle member 30 form a second set of mating members while protrusion member 106 and receptacle member 32 form a third set of mating members. While each of protrusion members 102, 104, 106 have a semi-spherical upper end as viewed in FIG. 1, each of the mating receptacle members 28, 30, 32 have unique shapes as shown more clearly in FIGS. 6 and 7A–7C. In particular, receptacle 28 is relatively shallow such that when frame 100 is in the scanning position (shown in FIG. 3) protrusion member 102 contacts an upper surface 30a of receptacle member 30 thereby restraining further movement of frame 100 toward gate 20 (that is, in the "Z" direction labeled in FIG. 6) and correctly positioning frame 100 in the scanning position in the "Z" direction. Receptacle 32 is somewhat elongated in the direction up and down as viewed in the main view of FIG. 7A–7C, and serves to correctly position frame 100 in the Y and Theta X directions, while receptacle 28 serves to correctly position frame 100 in the X, Theta Z and Theta Y directions. By "Theta X", "Theta Y", "Theta Z" is meant the angle of the rotation around the X, Y and Z axes, respectively. All three sets of members assist in restraining any lateral movement (that is, in or out of the paper, or to the left and right, as viewed in FIG. 1) or rotational movement of frame 100 relative to gate 20.

In operation of the embodiment of FIGS. 1–7, 7B, 7C, it will be assumed frame 100 is in the scanning position shown in FIG. 3. A first elongated film ("films" sometimes being referenced as "filmstrips" in this application) is passed lengthwise through gate 20 at the image plane 34, until an image on the film is correctly positioned in the gate for scanning. Edge guides 22, 24 serve to maintain the film in a correct sideways position within gate 20. Light is directed from guide 56 as a line (extending left and right as viewed in FIG. 1) through the image to be scanned, and then through lens 132 and onto sensor assembly 122. One line at a time is projected by lens 132 onto sensor assembly 122 and the image is then advanced line by line through gate 20 until the entire image has been scanned by sensor assembly 122. Sensor assembly 122 and associated electronics (not shown) provide a digital image data signal corresponding to the scanned image, in a known manner. It will be appreciated from this description, that one full frame of an image in gate 20 could be illuminated onto a full frame area array CCD sensor instead of using linear sensors.

After scanning images on the first filmstrip, it may be desirable to scan a second film of different format (including film width) than the first film. However, in situations where gate 20 needs to be replaced to accommodate different format films, the frame 100, lens systems 132, 134 and sensor assembly 122 can be moved as a unit by cylinder 160 acting on frame 100, away from gate 20 to the retracted position of FIG. 4. Illuminator housing 50 can also be swung away from gate 20. Thus, there is easy access to gate 20 for changing the complete gate or a portion of it. This is also true in the case where an existing gate 20 merely needs to be cleaned or repaired.

When any necessary work on gate 20 has been completed, frame 100 can be moved back into the scanning position. During this movement, the three sets of mating members ensure that frame 100 becomes correctly positioned in the scanning position, and is restrained from further movement out of that position. If film format has been changed, cylinder 150 can be activated to move lens assembly 132 out of the optical path and lens assembly 134 into the optical path. In any event, whichever lens assembly is used, a line of the image to be scanned will be correctly focussed by the lens assembly 132 or 134 onto sensor assembly 122 without any independent adjustment of such lens assembly 132 in the direction of axis 155. Light can then be directed through an image on the second film, through the lens assembly 134, and onto sensor assembly 122 to obtain the corresponding digital image data signal.

Figure 1:
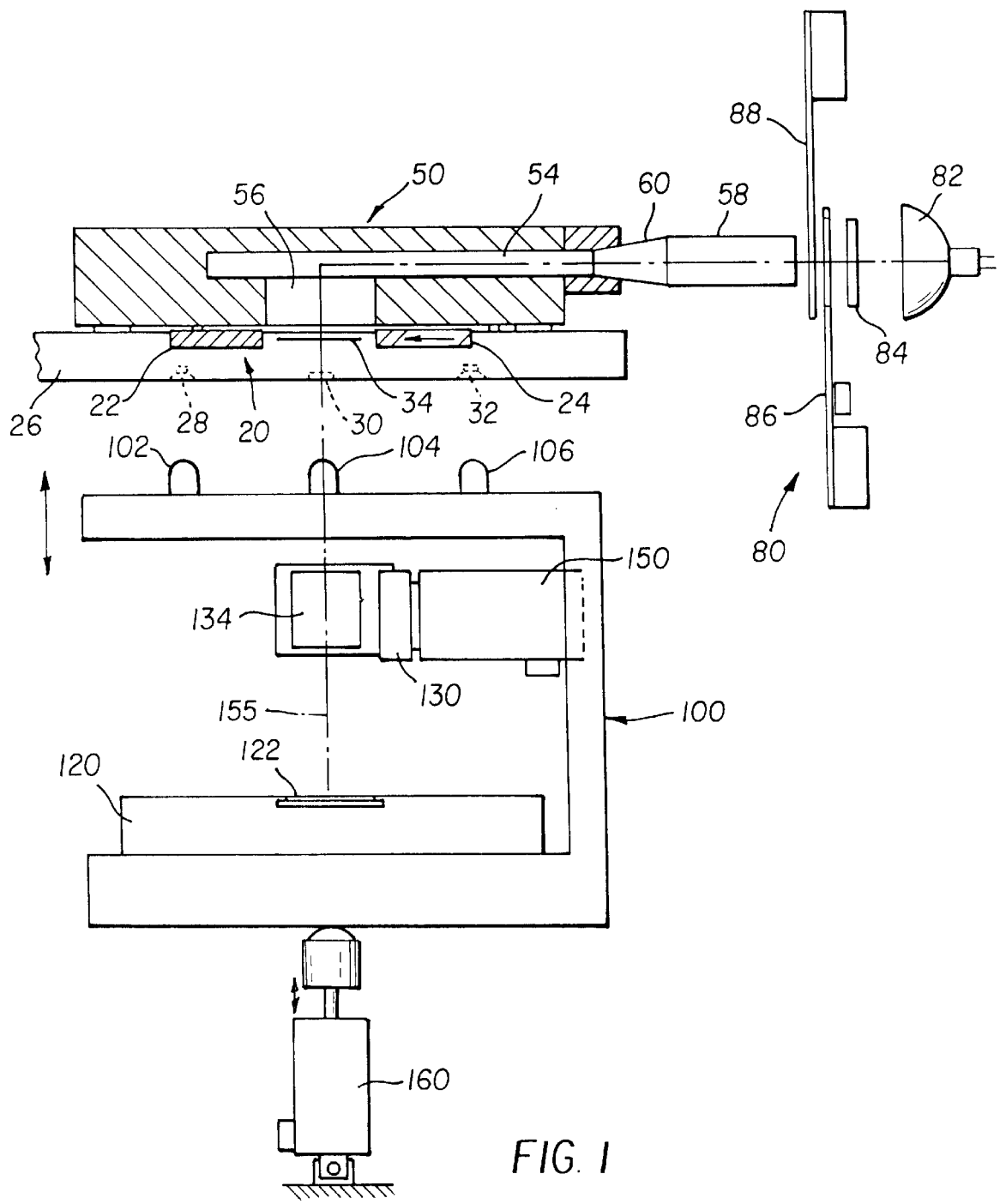
FIG. 1 is a vertical cross-section of a scanner of the present invention.
Figure 2:
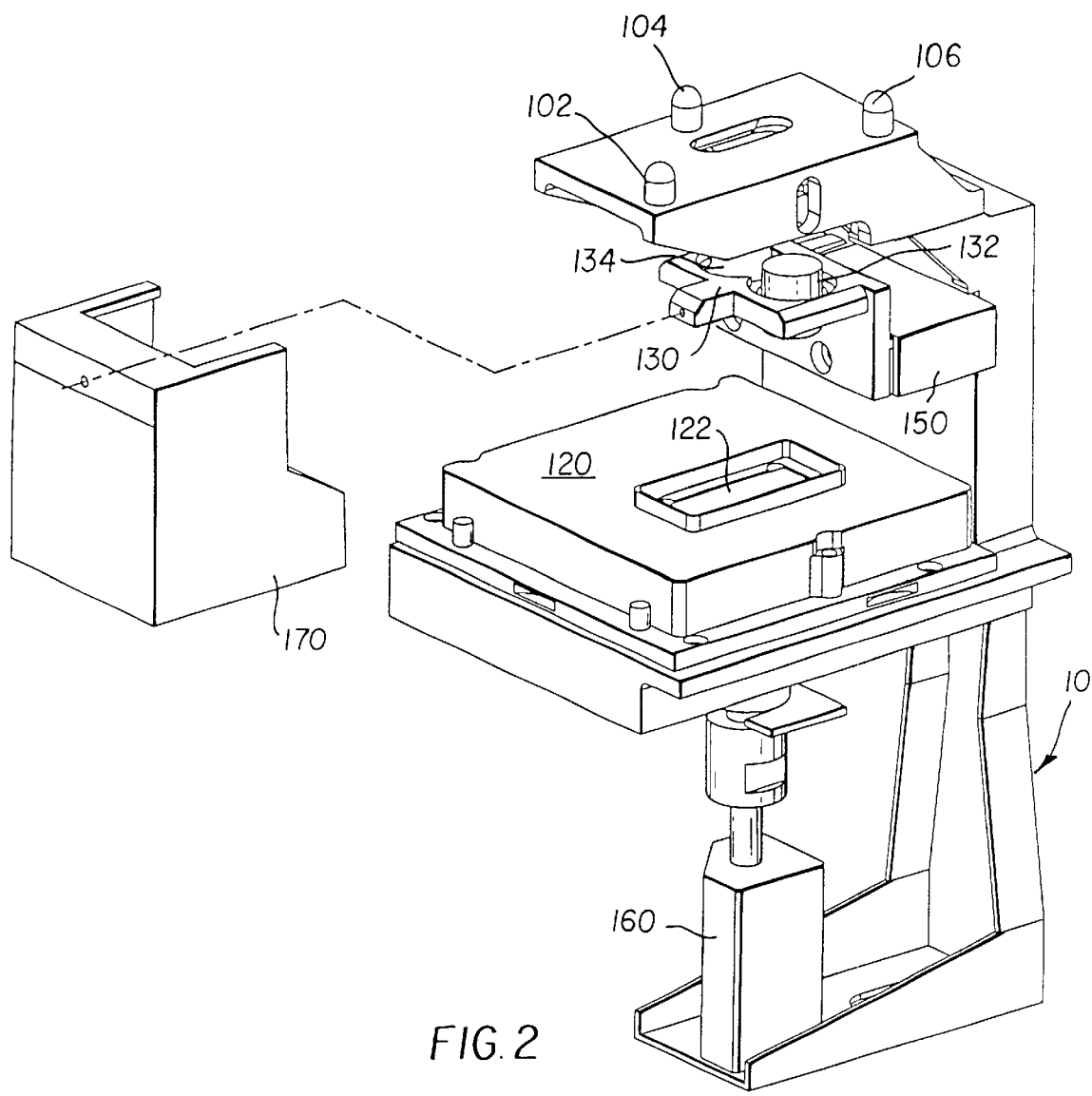
FIG. 2 is a perspective view of the scanner the scanner of FIG. 1 without the film gate.
Figure 8:
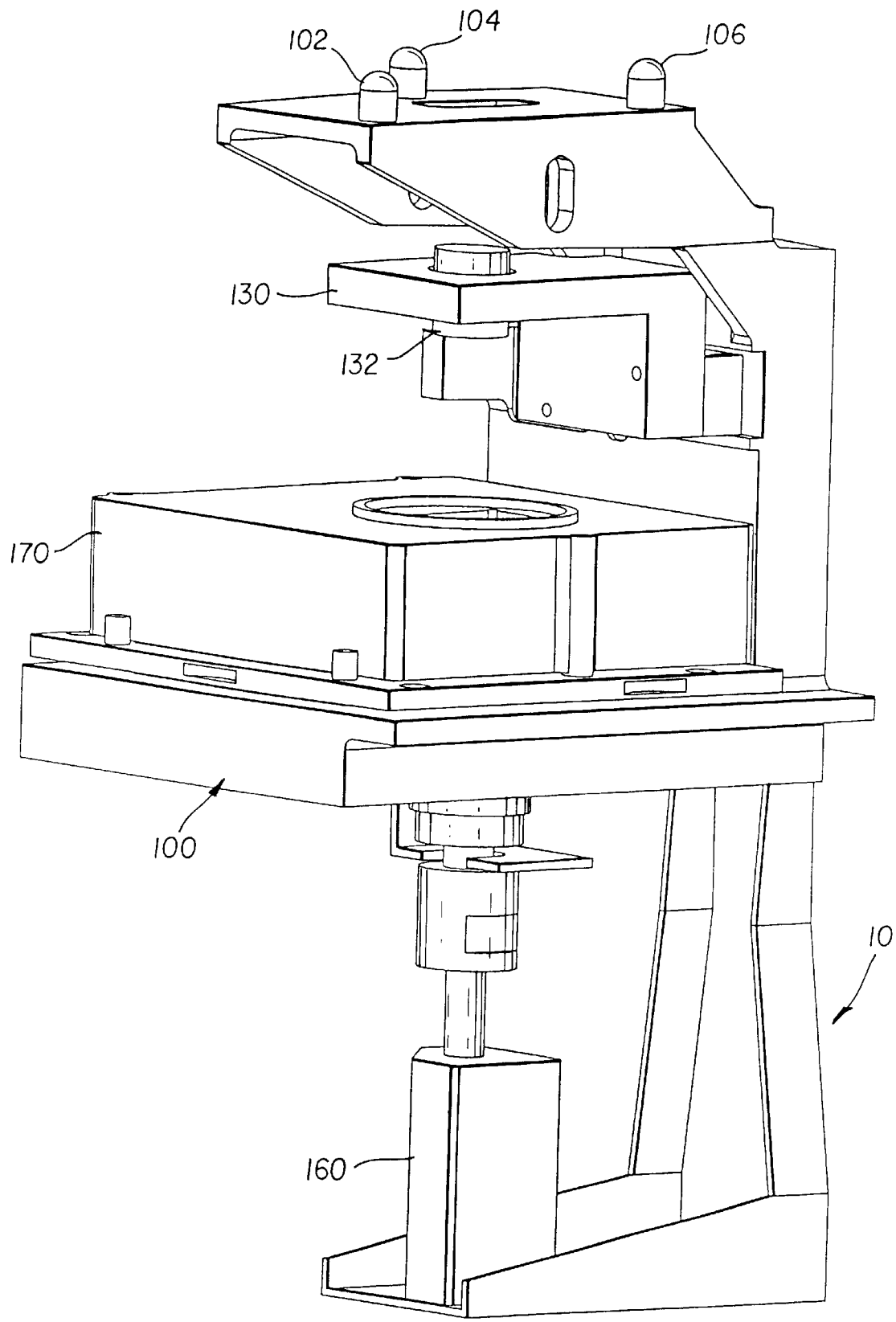
FIG. 8 is a perspective view of another embodiment of a scanner of the present invention.

The scanner of FIG. 8 is similar in construction to that of FIGS. 1–A7, 7B, 7C, and is used in a similar manner, except that. mount 130 carries only one lens assembly 132 which is immovable in any direction relative to frame 100. Such and arrangement allows for automatic correct focussing of lens 132 when frame 100 is moved away from gate 20 for any reason (such as for cleaning or repair).

Figure 10:
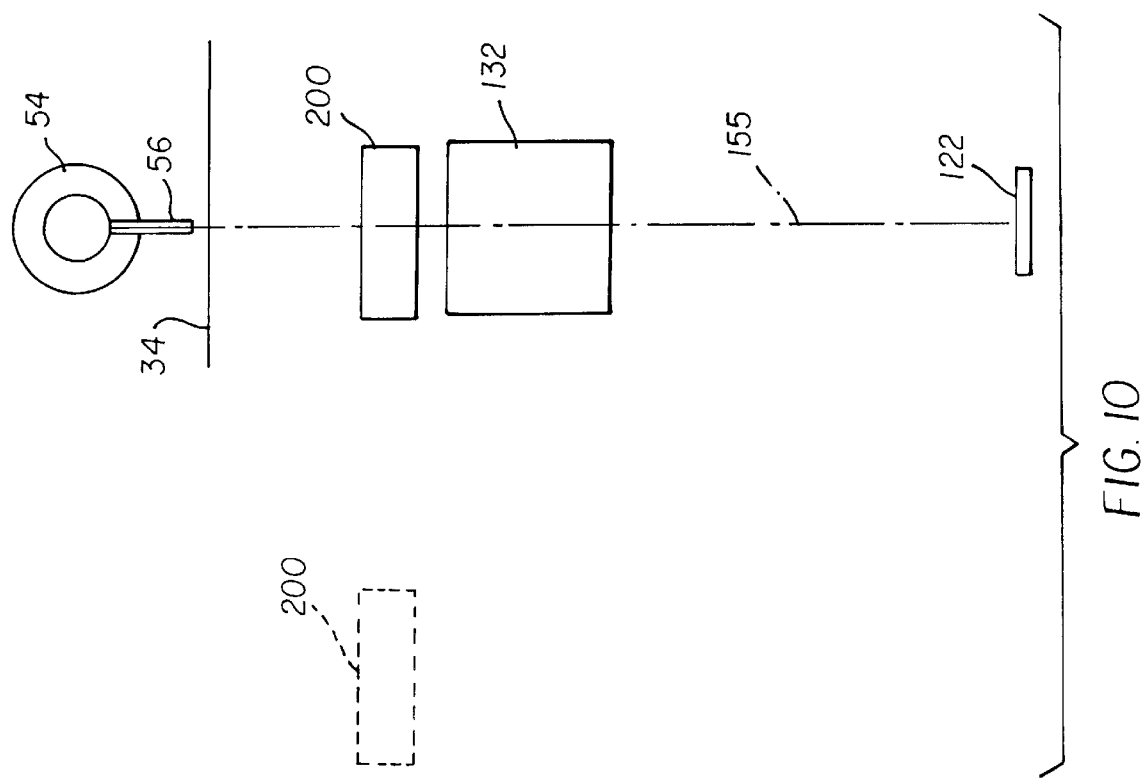
FIGS. 9–13 are schematic representations of various lens and sensor configurations which can be used in scanners of the present invention.
Figure 9:
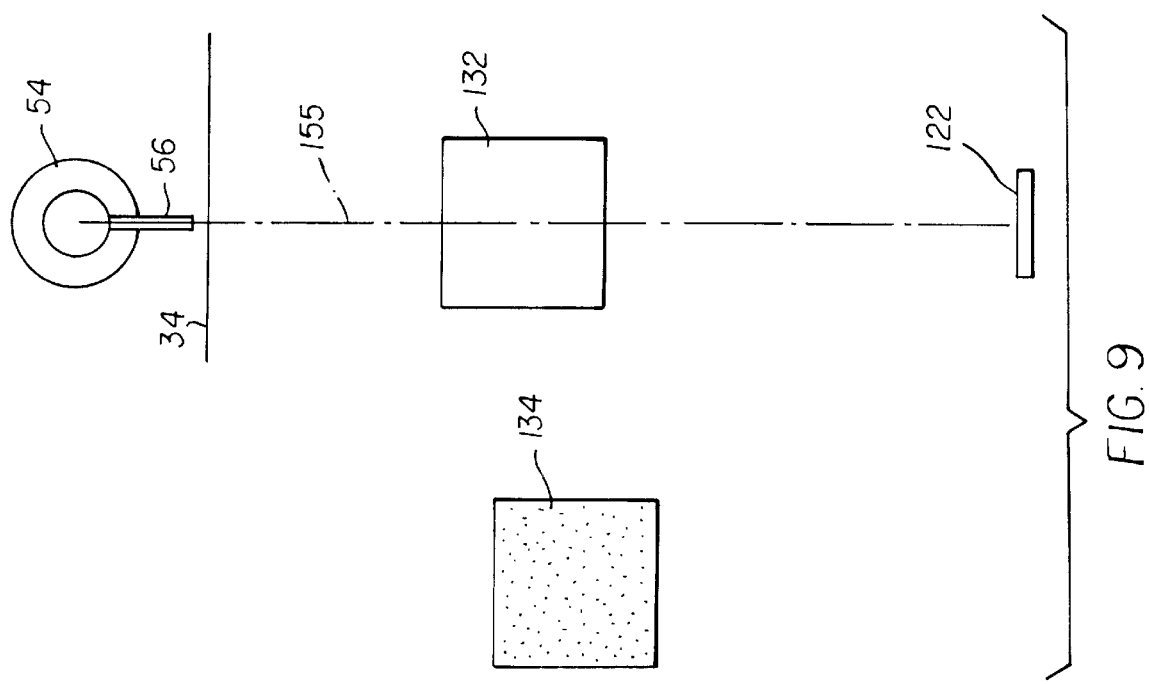

FIGS. 9–13 schematically illustrate various lens and sensor configurations. In particular, FIG. 9 illustrates the arrangement of the scanner in FIGS. 1–7A, 7B, 7C where lens assemblies 132, 134 are moved into the optical path by linear motion. Alternatively though, rotational motion could be used where the two lens assemblies 132, 134 rotate about a common rotational axis (such as when they are mounted on a turret) to bring each in turn into the optical path. FIG. 10 illustrates the possibility of a one lens assembly in the form of diopter 200 being linearly or rotatably movable into and out of the optical path of a fixed lens assembly. In this arrangement lens assembly 132 alone is capable of correctly focussing images from one format of film onto sensor assembly 122, while the diopter 200 must be aligned with lens assembly 132 so that together they can correctly focus images from another format film onto sensor assembly 122.

Figure 12:
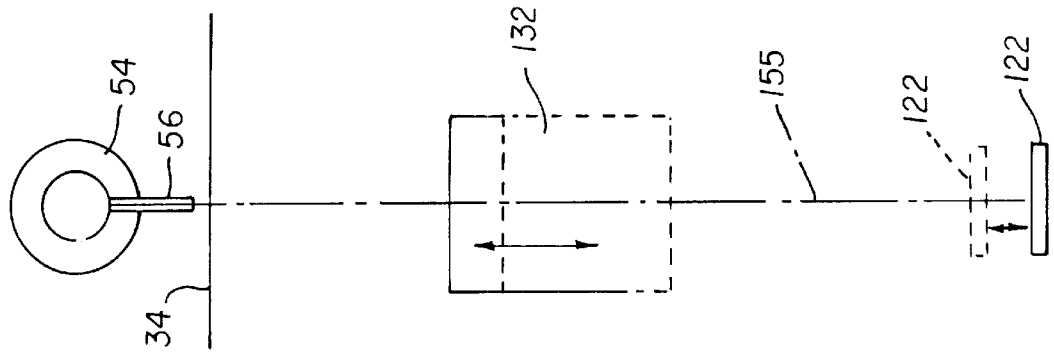
Figure 11:
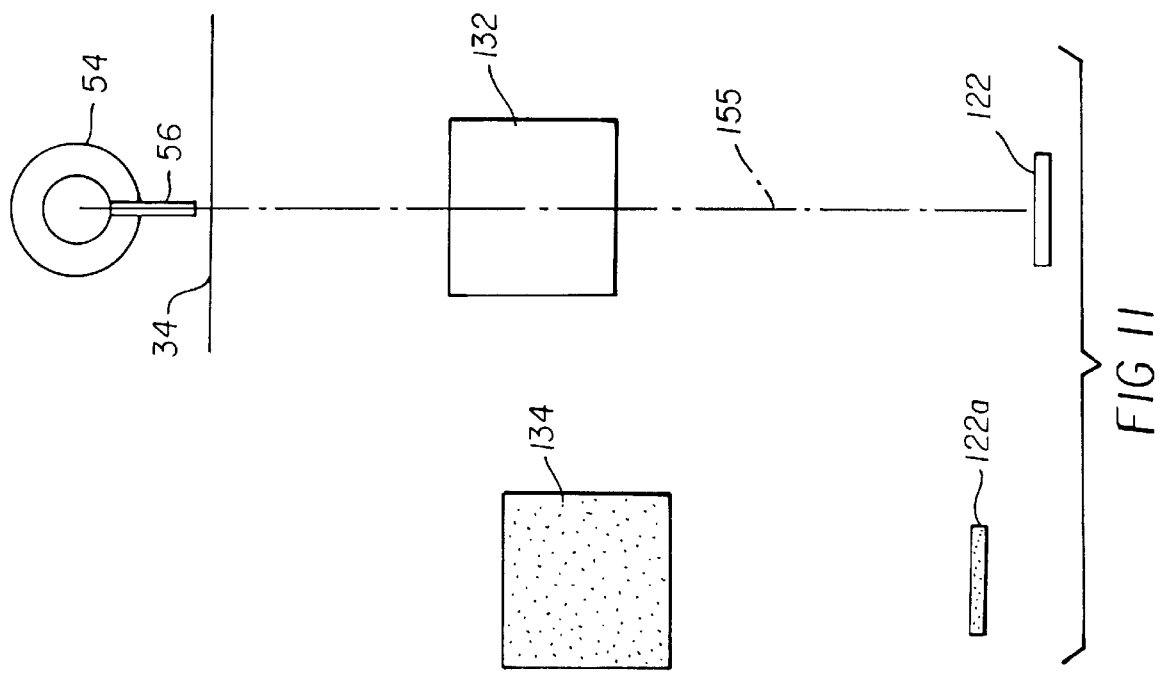
Figure 13:
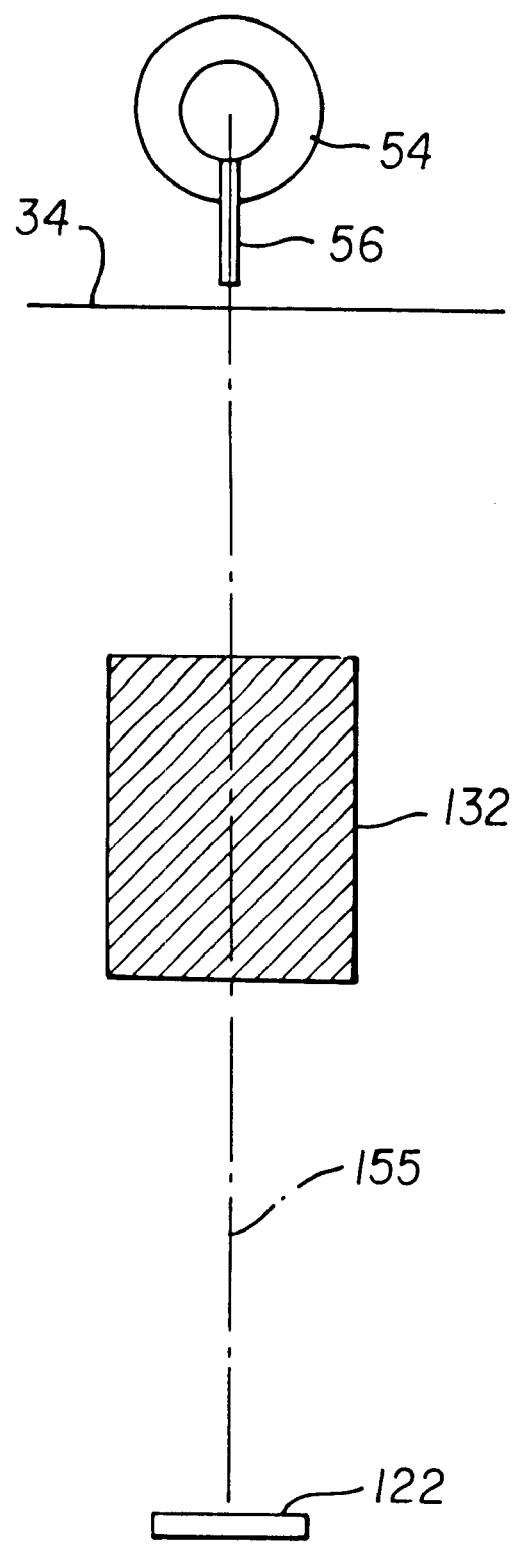

FIG. 11 illustrates an alternative embodiment in which there is provided two lens/CCD combinations, namely lens 132 and CCD 122 as a first combination, and lens 134 and CCD 122a as a second combination. The combinations can be moved into and out of the optical path by linear or rotational movement. In FIG. 12 a single lens 132 and CCD 122 combination is provided, both of which are movable along the optical axis to accommodate different film formats. FIG. 13 uses a single CCD fixed in place relative to the frame (not shown in any of FIGS. 9–13) while lens 132 is a zoom lens to accommodate the different film formats. Note that in all of the embodiments of FIGS. 9–13 the lens and CCD move with the frame as the frame is moved along the optical axis toward and away from the film plane 34 established by the film gate. However, in the embodiment of FIG. 12 an additional adjustment of the lens 132 along the optical axis 155, which is independent of movement of the frame, is also provided.

The invention has been described in detail with particular reference to certain preferred embodiments thereof, but it will be understood that variations and modifications can be effected within the spirit and scope of the invention.

What is claimed is:

1. A scanner comprising:
   (a) a gate to receive a media carrying an image to be scanned;
   (b) a frame movable along an optical axis toward and away from the gate between a scanning position and a retracted position spaced further away from the gate than the scanning position; and
   (c) a sensor and a lens mounted on the frame, said sensor and said lens being mounted on said frame so as to be immovable relative to said frame along the optical axis, said sensor and lens being adapted to move together with the frame between the scanning and retracted positions, so that the lens can focus at least part of an image in the gate onto the sensor;
   wherein the frame and gate together have at least one set of mating members which when mated, define the scanning position, said mating members being spaced apart from each other in said retracted position.

2. A scanner according to claim 1 additionally comprising a driver connected to the frame, to move the frame and attached sensor and lens between the scanning and retracted positions.

3. A scanner according to claim 1 wherein at least a portion of the frame contacts the scanning gate when the frame is in the scanning position.

4. A scanner according to claim 1 wherein the set of mating members comprises a protrusion member on an upper end of said frame and a receptacle member on said gate.

5. A scanner according to claim 1 wherein the mating members restrain movement of the frame toward the gate, lateral movement of the frame with respect to the gate, and rotational movement of the frame with respect to the gate.

6. A scanner according to claim 1 wherein the frame and gate together have at least three sets of said mating members, each set having a protrusion member and a receptacle member, the three sets respectively restraining movement of the frame toward the gate, lateral movement of the frame with respect to the gate, and rotational movement of the frame with respect to the gate.

7. A scanner comprising:
   (a) a gate to receive a media carrying an image to be scanned;
   (b) a frame positioned at an optical axis and movable along the optical axis toward and away from the gate between a scanning position and a retracted position spaced further away from the gate than the scanning position; and
   (c) a sensor and at least two pre-aligned lenses mounted on the frame so as to be immovable relative to said frame along the optical axis, said sensor and said lenses moving with the frame between the scanning and retracted positions, each of the lenses being transversely movable in turn into an optical path between the gate and the sensor when the frame is in the scanning position so as to focus at least part of an image in the gate onto the sensor;
   wherein the frame and gate together have at least one set of mating members which when mated, define the scanning position, said mating members being spaced apart from each other in said retracted position.

8. A scanner according to claim 7 wherein the lenses are moved in turn into the optical path by linear or rotational motion.

9. A scanner according to claim 8 wherein the sensor and lenses are attached to the frame so as to be immovable relative to the frame in the direction toward and away from the gate.

10. A scanner according to claim 7 additionally comprising:
   a first driver connected to the frame, to move the frame and attached sensor and lens between the scanning and retracted positions; and
   a second driver connected to the lenses to move each into and out of the optical path.

11. A scanner according to claim 8 wherein at least a portion of the frame contacts the scanning gate when the frame is in the scanning position.

12. A scanner according to claim 11 wherein the frame and gate together have at least three sets of said mating members, each set having a protrusion member and a receptacle member, the three sets respectively restraining movement of the frame toward the gate, lateral movement of the frame with respect to the gate, and rotational movement of the frame with respect to the gate.

13. A scanner according to claim 7 wherein the set of mating members comprises a protrusion member and a receptacle member.

14. A scanner according to claim 7 wherein the mating members restrain movement of the frame toward the gate, lateral movement of the frame with respect to the gate, and rotational movement of the frame with respect to the gate.

15. A scanner according to claim 7 additionally comprising an illumination system to illuminate an image in the gate.

16. A method of scanning images carried by elongated films, using a scanner having a gate, a frame, and a lens and sensor both attached to the frame, the method comprising:
   (a) when the frame is in a scanning position, directing light through an image on a first film provided at the gate, through the lens and onto the sensor, to convert the image into a corresponding image signal;
   (b) moving the frame, lens and sensor as a unit away from the gate by urging the frame along an optical axis away from the gate;
   (c) modifying at least a portion of the gate to accommodate a second film of a width different from the fist film;
   (d) moving the frame back into the scanning position so that at least part of an image on the second film in the gate will be focussed by the lens onto the sensor; and
   (e) directing light through an image on the second film, through the lens and onto the sensor, to convert the image into a corresponding image signal;
   wherein the frame and gate together have at least one set of mating members which are mated when the frame is in the scanning position and are spaced apart from each other when the frame is in a retracted position away from said gate.

17. A method according to claim 16 wherein the modification in step (c) is accomplished by replacing at least a portion of the gate.

18. A method according to claim 16 wherein in step (d) the part of the image on the second film is focussed by the lens onto the sensor without movement of the lens with respect to the frame in a direction toward or away from the gate.

19. A method according to claim 16 wherein at least a portion of the frame contacts the scanning gate when the frame is in the scanning position.

20. A method according to claim 16 wherein the set of mating members comprises a protrusion member and a receptacle member.

21. A method according to claim 16 wherein the frame and gate together have at least three sets of said mating members, each set being mated when the frame is in the scanning position, each set having a protrusion member and a receptacle member, the three sets respectively restraining movement of the frame toward the gate, lateral movement of the frame with respect to the gate, and rotational movement of the frame with respect to the gate.

22. A method of scanning images carried by elongated films, using a scanner having a gate, a frame, at least two lenses attached to the frame, and a sensor attached to the frame, the method comprising:
   (a) when the frame is in a scanning position, directing light through an image on a first film, along an optical axis and through a first one of the lenses and onto the sensor, to convert the image into a corresponding image signal;
   (b) moving the frame, lens and sensor as a unit away from the gate by urging the frame away from the gate in a direction along the optical axis,
   (c) modifying at least a portion of the gate to accommodate a, second film of a width different from the first film;
   (d) moving the frame back into the scanning position so that at least part of an image on the second film in the gate will be focussed by the lens onto the sensor;
   (e) moving the first lens out of the optical axis and moving a second one of the lenses into the optical axis; and
   (f) directing light through an image on the second film, along the optical axis and through the second lens and onto the sensor, to convert the image into a corresponding image signal;
   wherein the frame and gate together have at least one set of mating members which are mated when the frame is in the scanning position and are spaced apart when the frame is in a retracted position away from said gate.

23. A method according to claim 22 wherein the first and second lenses are moved out of, and into, the optical axis by a linear motion perpendicular to the optical axis or by a rotational motion.

24. A method according to claim 22 wherein in step (d) at least a part of the image on the second film is focussed by the second lens onto the sensor without movement of the second lens with respect to the frame in a direction toward or away from the gate.

* * * * *